US008209509B2

(12) United States Patent
Renno

(10) Patent No.: US 8,209,509 B2
(45) Date of Patent: Jun. 26, 2012

(54) ACCESSING MEMORY IN A SYSTEM WITH MEMORY PROTECTION

(75) Inventor: Erik Knutsen Renno, Trondheim (NO)

(73) Assignee: Atmel Corporation, San Jose, CA (US)

( * ) Notice: Subject to any disclaimer, the term of this patent is extended or adjusted under 35 U.S.C. 154(b) by 446 days.

(21) Appl. No.: 12/120,165

(22) Filed: May 13, 2008

(65) Prior Publication Data
US 2009/0287894 A1 Nov. 19, 2009

(51) Int. Cl.
G06F 13/00 (2006.01)
G06F 12/14 (2006.01)
(52) U.S. Cl. .............. 711/163; 711/164; 711/E12.103
(58) Field of Classification Search .................. None
See application file for complete search history.

(56) References Cited

U.S. PATENT DOCUMENTS

| 5,825,878 | A | 10/1998 | Takahashi |
| 5,943,507 | A | 8/1999 | Cornish et al. |
| 6,532,533 | B1 | 3/2003 | Bhandal et al. |
| 6,854,039 | B1 | 2/2005 | Strongin et al. |
| 7,107,459 | B2 | 9/2006 | Caronni et al. |
| 7,159,120 | B2 * | 1/2007 | Muratov et al. ............... 713/182 |
| 7,178,005 | B1 | 2/2007 | Jordan et al. |
| 7,185,178 | B1 | 2/2007 | Barreh et al. |
| 7,216,216 | B1 | 5/2007 | Olson et al. |
| 7,240,160 | B1 | 7/2007 | Hetherington |
| 7,337,360 | B2 * | 2/2008 | Shen et al. ..................... 714/20 |
| 2002/0147930 | A1 * | 10/2002 | Pritchard et al. ............. 713/202 |
| 2005/0015559 | A1 * | 1/2005 | Shen et al. ..................... 711/163 |
| 2007/0079093 | A1 | 4/2007 | Axford et al. |
| 2009/0113155 | A1 * | 4/2009 | Beals ............................ 711/164 |
| 2010/0235897 | A1 * | 9/2010 | Mason et al. ..................... 726/7 |

OTHER PUBLICATIONS

Kosche, et al., "Method and Apparatus for Precisely Identifying Effective Addresses Associated with Hardware Events", U.S. Appl. No. 11/589,492, 133 pages.
Kumar, et al. "A System for Coarse Grained Memory Protection in Tiny Embedded Processors", 2007, San Diego, 6 pages.
Hetherington, et al., "Aparatus and Method for Fine-Grained Multithreading in a Multipipelined Processor Core", U.S. Appl. No. 10/880,488, 46 pages.

* cited by examiner

Primary Examiner — Hetul Patel
(74) Attorney, Agent, or Firm — Fish & Richardson P.C.

(57) ABSTRACT

The present disclosure includes, among other things, methods, systems, program products, and devices for providing access to memory in a system with memory protection. A request is received from a processor for a memory access at a first memory location. A second memory location is determined. The second memory location is associated with the first memory location and is protected from access by the processor. The requested memory access is performed at the second memory location.

29 Claims, 6 Drawing Sheets

ACCESSING MEMORY IN A SYSTEM WITH MEMORY PROTECTION

TECHNICAL FIELD

This specification relates generally to digital memory.

BACKGROUND

Modern computer systems can map peripheral control registers into a single uniform memory space. The memory space can thus include both peripheral control registers and traditional memories like Dynamic Random Access Memory (DRAM) and hard disk drives. The peripherals can be controlled by programming the peripheral control registers using load and store instructions issued by a processor.

FIG. 1 shows a diagram of an example memory map 100. Regions of the memory map, e.g., 102, 104, 106, and 108, correspond to physical memory. Memory can be, for example, DRAM, peripheral control registers, Flash memory, hard disk memory, and so on.

In FIG. 1, regions 102 and 104 represent peripheral control registers. Region 102 corresponds to a Universal Asynchronous Receiver/Transmitter (UART) and region 104 corresponds to a Pulse-Width Modulator (PWM). Region 106 corresponds to Flash memory, and region 108 corresponds to Random Access Memory (RAM), e.g., DRAM.

Memory regions can contain sub-regions. For example, region 102 contains UART control registers 110, 112, 114, and 116. A UART can be configured by writing values to UART control registers. Data for the UART to transmit is written to the transmit holding register 112, and data the UART has received is read from the receive holding register 110. The baud rate can be configured by writing a value to the baud rate register 114. Other control information, e.g., parity, can be written to a control register 116.

In various systems, preventing erroneous access to critical peripherals is advantageous. An example of such a peripheral is a PWM used to control electric motors. The PWM outputs a pulse train that controls the motor. If the control registers of the PWM module are inadvertently updated with erroneous values, the motor can start operating out of control, possibly causing damage to the application and the environment surrounding it. Inadvertent access can be caused by, for example, errors in software code, electrical noise, and the like.

SUMMARY

The present disclosure includes, among other things, methods, systems, program products, and devices for providing access to memory in a system with memory protection. A request is received from a processor for a memory access at a first memory location. A second memory location is determined. The second memory location is associated with the first memory location and is protected from access by the processor. The requested memory access is performed at the second memory location.

Particular implementations of the subject matter described in this specification can realize one or more of the following advantages. A processor can securely access fine-grained memory regions in a system with coarse-grained memory protection. Unlocking hardware can be kept inside a single configurable device, so that different applications may add unlocking to different registers, depending on application needs. The same unlocking algorithm can be used for multiple protected memory regions.

DESCRIPTION OF DRAWINGS

Like reference symbols in the various drawings indicate like elements.

DETAILED DESCRIPTION

Example Method for Accessing Memory

Figure 1:
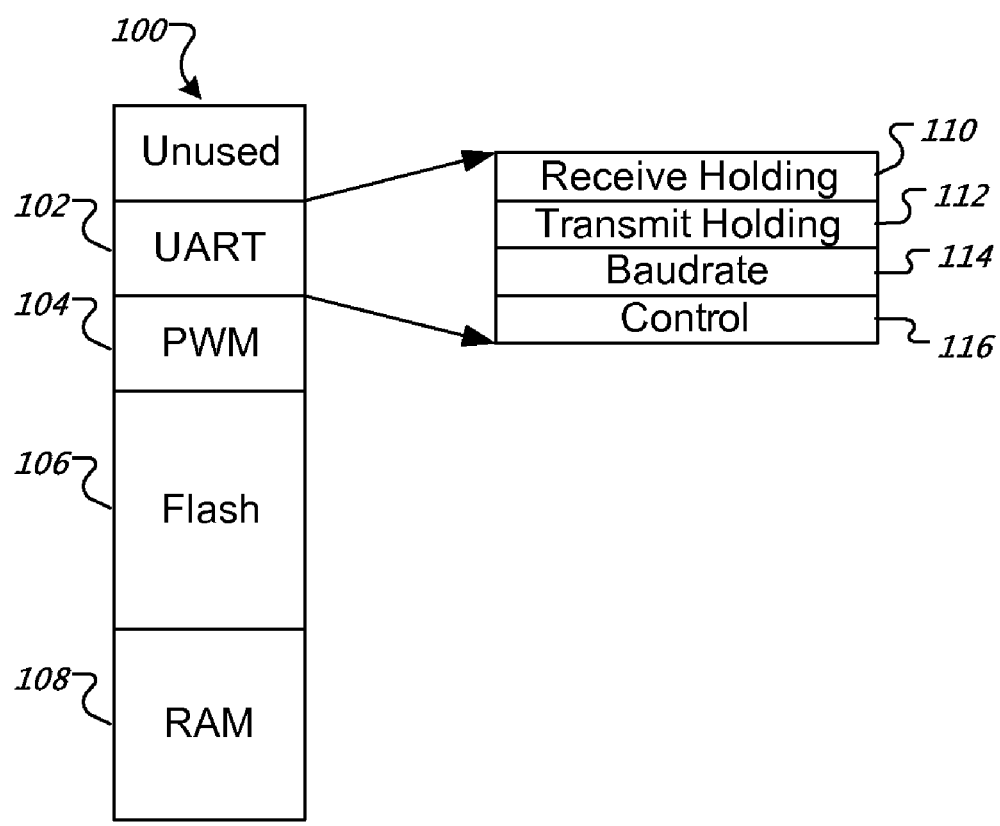
FIG. 1 is a diagram of an example memory map.
Figure 2:
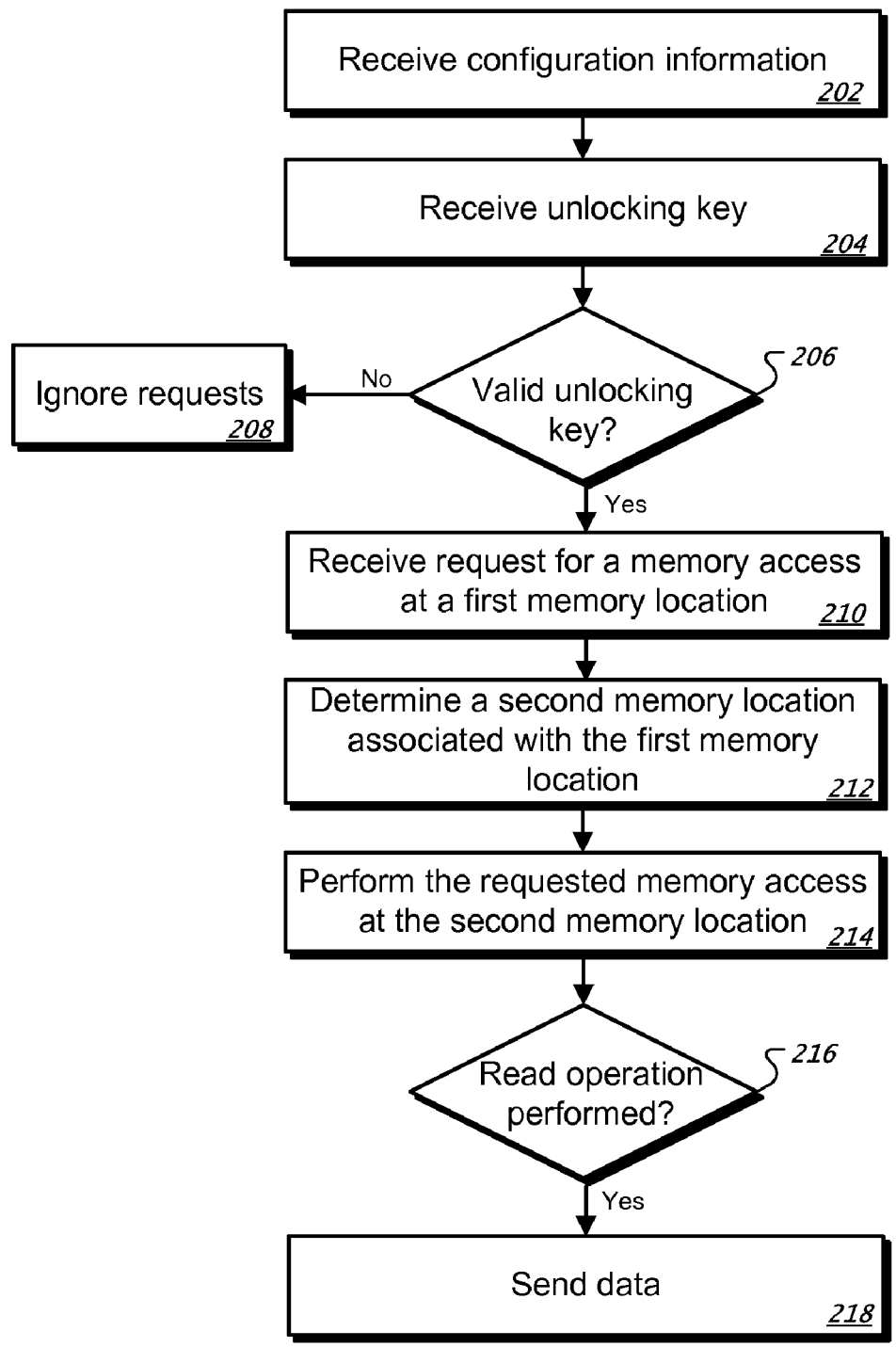
FIG. 2 is a flowchart of an example method for accessing memory in a system with memory protection.

FIG. 2 is a flowchart of an example method for accessing memory in a system with memory protection. For purposes of illustration, the method will be described with respect to a system (e.g., a processor, a Secure Access Unit (SAU), or the like) that performs the method.

The system receives configuration information (step 202). In some implementations, the configuration information specifies a mapping between a first plurality of memory locations and a second plurality of memory locations. In other implementations, the mapping is fixed, e.g., in hardware or Read Only Memory (ROM). In some implementations, the configuration information specifies other values. For example, the configuration information can specify valid unlocking keys or methods to determine whether unlocking keys are valid.

In some implementations, the system receives an unlocking key (step 204). The unlocking key can be, for example, a single number, a series of numbers, a series of characters, and so on.

If the system receives an unlocking key, the system determines whether the unlocking key is valid (step 206). In some implementations, the system compares the received unlocking key to an unlocking key received in the configuration information. In other implementations, the system performs another method to determine whether the unlocking key is valid. For example, the system can determine a valid unlocking key based on the time of day or the current clock cycle and compare the determined unlocking key with the received unlocking key.

In various implementations, the unlocking key is based on a requested memory location. For example, the unlocking key can unlock only a certain register or a certain memory region. In some implementations, the unlocking key is only valid for a specified number of clock cycles. In other implementations, the unlocking key is received at the same time as a requested memory access and is only valid for that requested memory access.

If the unlocking key is not valid, the system ignores requests for memory access (step 208). In some implementations, the system sends a message indicating that it received an invalid unlocking key. For example, the system can generate an exception.

The system receives a request from a processor for a memory access at a first memory location (step 210). A processor is a device, system, or the like that executes instructions, e.g., a Central Processing Unit (CPU). Processors can be in embedded architectures. An example of an embedded processor is the AVR32 processor available from Atmel, Inc. of San Jose.

The memory access can be an operation such as read, write, execute, and the like. The request specifies the memory access. When the memory access is a write operation, the request can specify the data to be written. When the memory access is a read operation, the request can specify the amount of data to be read. When the memory access is an execute operation, the request can specify the amount of data to be read and executed.

A memory location is associated with a region of a memory map or space. The memory location can be, for example, a memory address, a pointer to a memory address, or the like. A processor can access (e.g., read from or write to) memory regions using memory locations.

The system determines a second memory location associated with the first memory location (step 212). The second memory location is protected from access by the processor. The second memory location can correspond to, for example, a critical peripheral device.

Typically, the system uses the configuration information to determine the second memory location. For example, the system can look up the second memory location in a table of associated memory locations. In some implementations, the system comprises channel registers. The first memory location is the location of a channel register, and the system determines the second memory location by reading the contents of the channel register.

Alternatively, a mapping between memory locations is fixed, e.g., in hardware or ROM. The system determines the second memory location by following the fixed instructions or fixed mapping.

In some implementations, the second memory location is protected by a memory protection device. Examples of memory protection devices include Memory Management Units (MMUs) and Memory Protection Units (MPUs). In some implementations, the memory protection device protects a memory region that is substantially larger than a region to be accessed at the second memory location. In those cases, the memory protection device is considered "coarse grained."

In various implementations, the memory protection device prevents the processor from accessing the second memory location under certain conditions. In some implementations, the prevention is based on an execution state of the processor. For example, the memory protection device can prevent the processor from accessing the second memory location when the processor is running in an unprivileged mode, and it can permit the processor to access the second memory location when the processor is running in a privileged mode (e.g., a supervisor mode).

In some implementations, the prevention is further based on the requested memory access. For example, the memory protection device can prevent access when the requested memory access is a write operation but allow access when the requested memory access is a read operation.

The system performs the requested memory access at the second memory location (step 214). For example, if the requested memory access is a write operation, the system writes data to the second memory location. If the requested memory access is a read operation (step 216), the system sends the data that it reads, e.g., to the processor (step 218).

Example Memory Map

Figure 3:
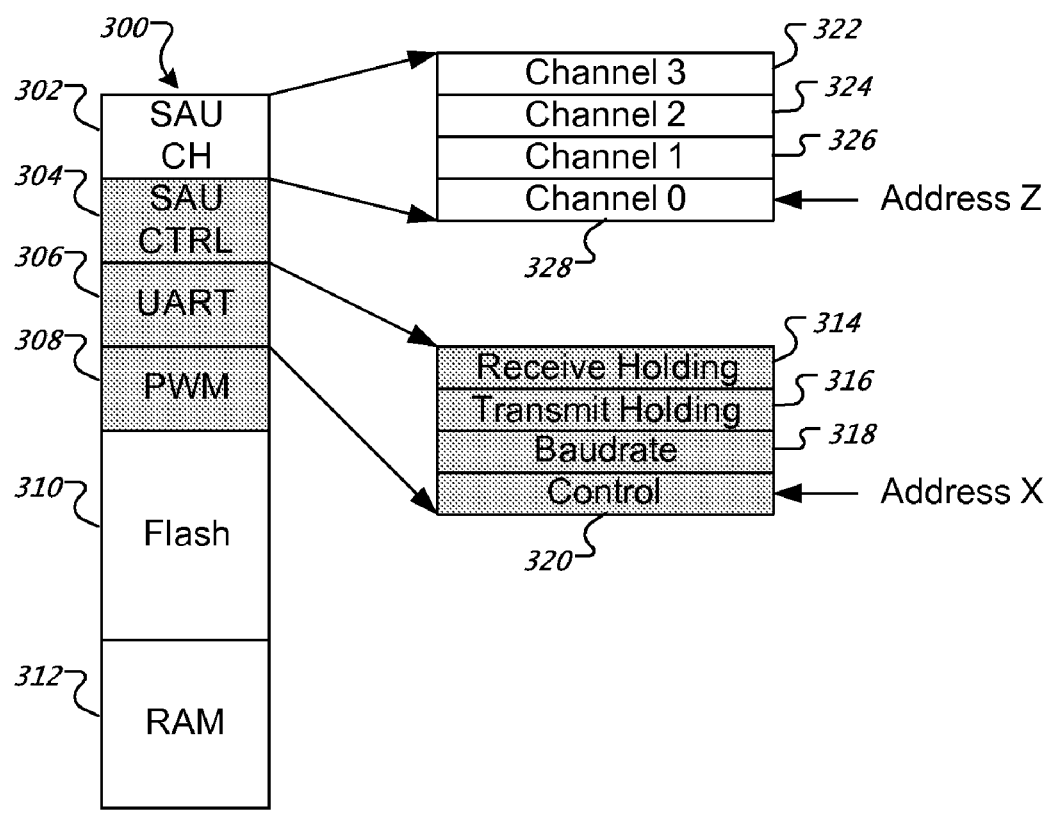
FIG. 3 is a diagram of an example memory map with a secure access unit.

FIG. 3 is a diagram of an example memory map 300 with a secure access unit (SAU). An SAU is a device or unit operable to provide access to memory in a system with memory protection, e.g., using the example method shown in FIG. 2. In this example, the SAU provides access channels to specified memory locations.

The SAU has memory that is shown in two regions 302 and 304 in the memory map. The example memory map also has regions for a UART 306, a PWM 308, Flash memory 310, and RAM 312.

The SAU has control registers 304 and channel registers 302. The control registers 304 of the SAU are protected, e.g., by a Memory Protection Unit (MPU) or the like, as are other memory regions (in this example, UART memory 306 and PWM memory 308). Protected addresses 304, 306, and 308 are shown in grey in FIG. 3. The UART registers 314, 316, 318, and 320 are within the UART memory region 306 and are thus protected and also shown in grey.

The MPU (or other memory protection hardware, e.g., a MMU or the like) partitions the memory space into chunks, and assigns a set of access restrictions on each chunk. Access restrictions can be, for example, read/write for a processor that is in supervisor mode, and read-only for a processor that is in application mode. The chunks can be of different size. In some implementations, each chunk is large relative to the size of a register, e.g., 1 kilobyte of address space or more. Furthermore, access to each chunk can be controlled by the execution state of a processor, e.g., supervisor or application mode.

The SAU control registers 304 are used for configuration of the SAU. Writing values to these registers selects how to map addresses in the SAU channel registers 302 to other memory. The SAU control registers 304 can also be used for, e.g., controlling access restrictions, unlocking keys, and so on. Typically, once these registers 304 have been configured, an MPU protects them from further modifications.

The SAU channel registers 302 specify channels (e.g., virtual addresses or memory locations) that a processor can access. The channel registers are not protected (e.g., they are not shown in grey in FIG. 3). A mapping scheme, either fixed or configurable, associates these channels (specified by the channel registers) with real memory locations, e.g., inside peripherals or other memory.

A channel can map a single address, or a range of addresses from the address space in the SAU (e.g., the channel registers) to addresses in other memory, e.g., peripherals. When a processor accesses an SAU channel register, e.g., 322, the SAU will act like a gateway or a proxy and perform the access to the mapped memory on behalf of the requesting processor. The mapped memory is protected from access by the processor, e.g., by an MPU.

Mechanisms required for unlocking a channel can be placed in the SAU control registers 304. For example, in some implementations, an unlocking key, e.g., 0x55, must be written to an unlocking register in the SAU control registers 304. Writing an unlocking key can open a window of a specified number of clock cycles during which the SAU will allow access to a SAU channel register, e.g., 322. The SAU can block accesses that do not supply a valid unlocking key.

The SAU can also inform the processor (or an application attempting to perform the memory access, e.g., using the processor) that an illegal access has been attempted, for example by issuing an interrupt or an exception. This will allow the application to perform a graceful shutdown or attempt to fix the problem that caused the invalid access.

The SAU can have multiple channels, e.g., specified by channel registers 322, 324, 326, and 328, protected to only allow valid accesses. In some implementations, each channel has a unique unlocking mechanism. In other implementations, the same unlocking mechanism is used for each channel.

In FIG. 3, a UART control register 320 is shown to have address X. Channel 0 in the SAU (e.g., channel register 328) is shown to have address Z. By writing proper values to associated registers in the SAU control registers 304, Channel 0 can be associated with address X. Since UART control register 320 (at address X) is protected, a processor can not access it.

However, SAU channel register 328 (e.g., Channel 0 at address Z) is not protected. If the processor reads from address Z, the SAU will stall the read, and initiate by itself a read from the associated address, e.g., address X. This access is not protected. The SAU access is not protected because, for example, the SAU can use a different communication path than the processor that does not go through an MPU. Alternatively, the MPU can be configured to accept accesses from an SAU and prevent accesses from other processors.

When the SAU has performed the read from address X, the read data is returned to the processor. In some implementations, the processor is unaware that the read from address Z actually has been performed from address X. The processor will experience a slightly longer read latency since the SAU has to perform an access before returning the read data. Similar operations are performed if the CPU writes to address Z; the SAU will perform a write to address X.

Example System with Protected Memory

Figure 4:
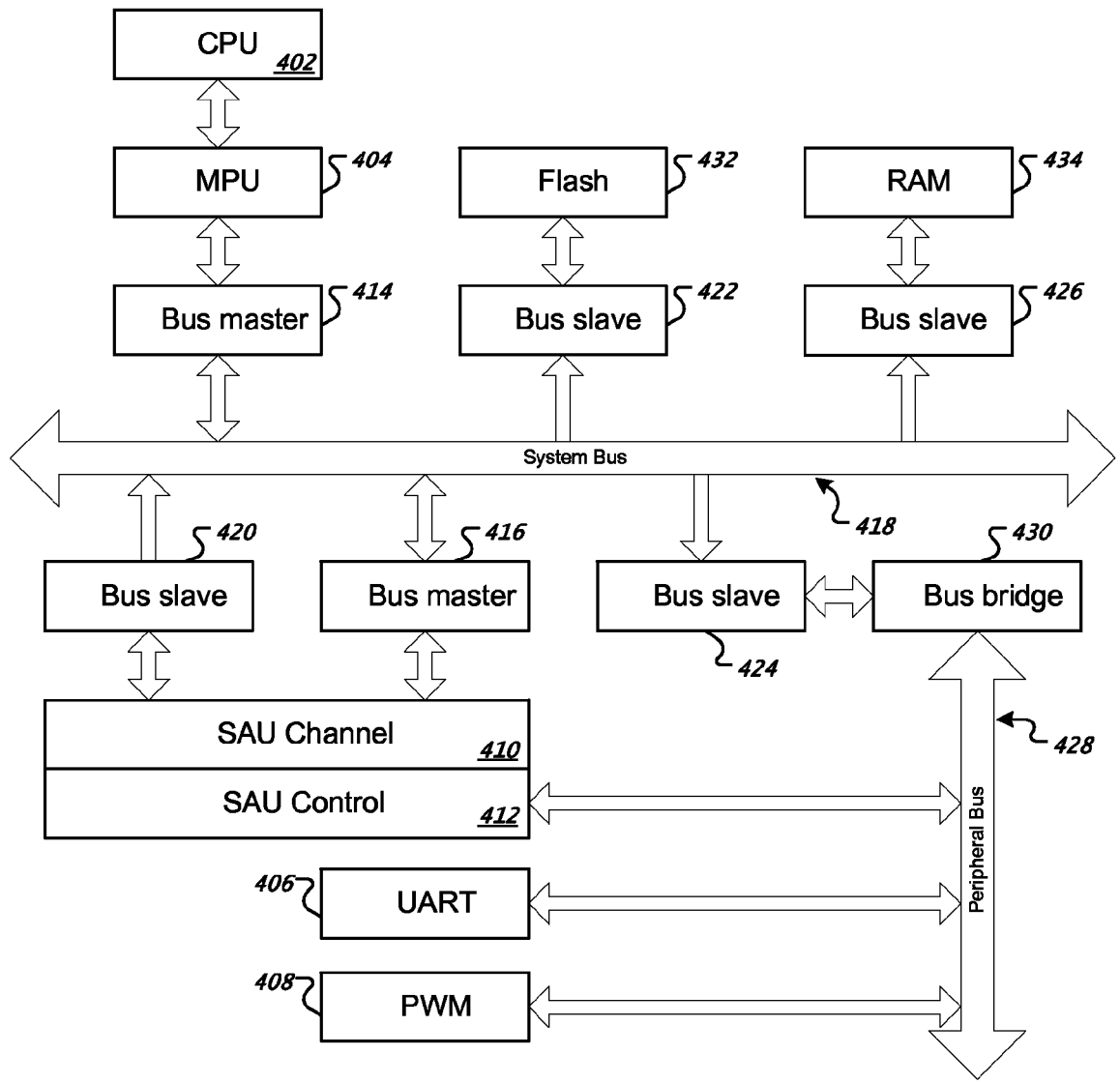
FIG. 4 is a diagram of an example system with a processor and protected memory.

FIG. 4 is a diagram of an example system with a processor (CPU 402) and protected memory. The example system includes memory protection hardware (MPU 404). The MPU 404 protects memory for a UART 406 and a PWM 408. An SAU 410 and 412 provides the CPU 402 with access to some of the memory protected by the MPU 404.

A bus master (e.g., 414 and 416) is a module that can initiate a transfer on the system bus 418, whereas a slave (e.g., 420, 422, 424, and 426) can only respond to a transfer from a master. A transfer can be either a read or write operation. The example system has a hierarchical bus system, with a high-bandwidth system bus 418 and a low-bandwidth peripheral bus 428. Low-bandwidth peripherals (e.g., in this example, the UART 406 and PWM 408) are connected to the peripheral bus 428, while high-bandwidth modules (e.g., Flash memory 432 and RAM 434) are connected to the system bus 418. The peripheral bus 428 is smaller in area and consumes less power than the system bus 418. A bus bridge 430 connects the peripheral and system buses. The bus bridge translates timing and signals from one bus domain to the other.

The MPU 404 sits between the CPU 402 and its bus master 414. The MPU listens to accesses that the CPU 402 attempts to perform. If the accesses do not have sufficient privileges, the access is aborted and the MPU 404 notifies the CPU 402. If the access has sufficient privileges, the access is placed on the system bus 418 and performed as intended by the CPU 402.

The CPU 402 can access certain regions that are protected by the MPU 404 through the SAU. For example, if the SAU is configured to provide access to a control register in the UART 406, the CPU 402 can access that register through the SAU. The SAU does not communicate with the UART 406 through the MPU 404 and is therefore not subject to the same access prevention as the CPU 402.

Example Device for Accessing Memory

Figure 5A:
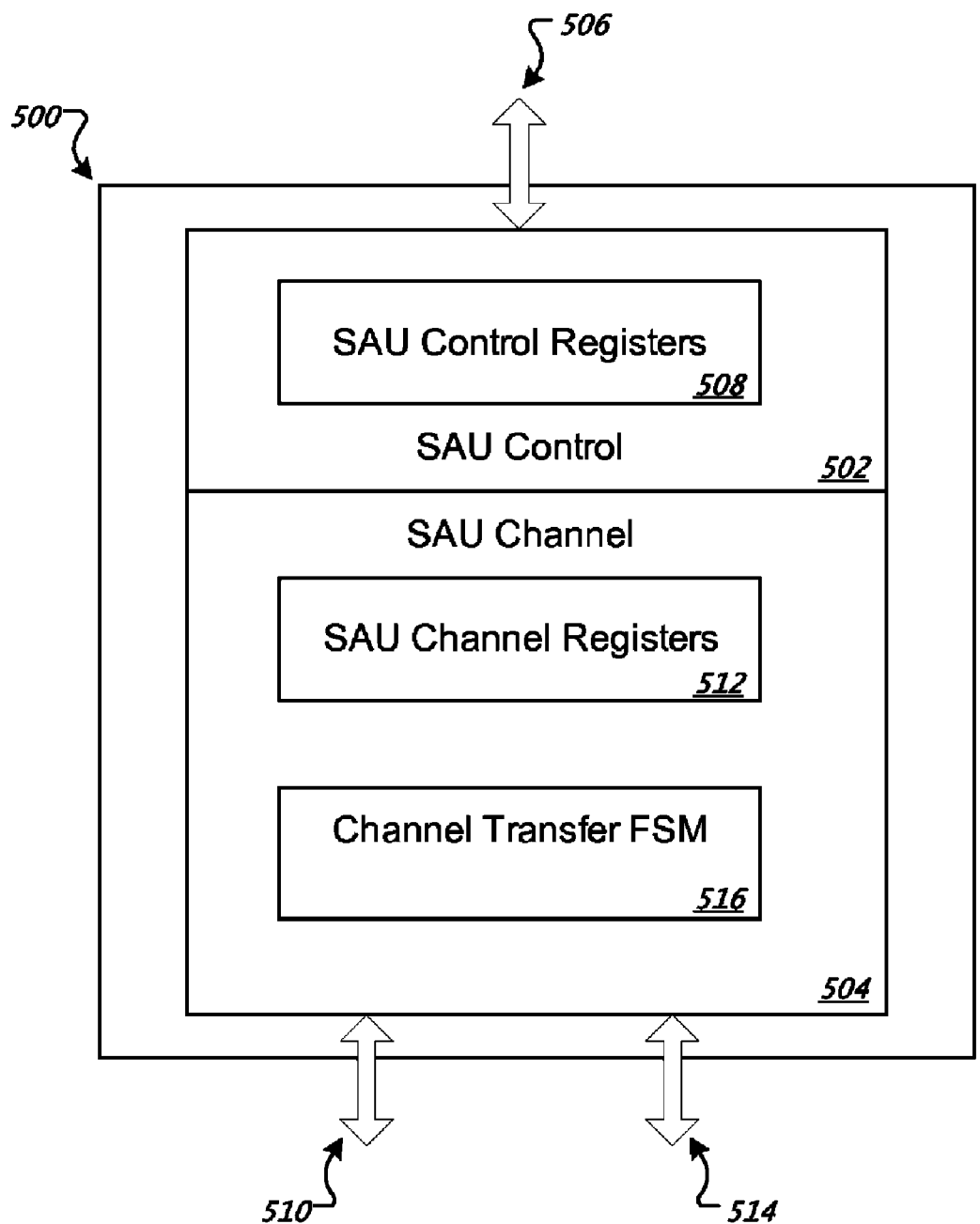
FIG. 5A is a block diagram of an example device that is configured for accessing memory in a system with memory protection.

FIG. 5A is a block diagram of an example device 500 that is configured for accessing memory in a system with memory protection, e.g., an SAU. The SAU 500 has a control section 502 and a channel section 504.

The SAU 500 can be implemented using a Hardware Description Language (HDL) language, for example, Verilog or Very High Speed Integrated Circuit HDL (VHDL). In some implementations, the SAU is implemented in a digital circuit, for example, a field-programmable gate array (FPGA), an application-specific integrated circuit (ASIC), or the like. In other implementations, the SAU is implemented using a general purpose processor.

In some implementations, the SAU has a control interface 506 for access to the SAU control registers 508. Typically, the control interface 506 is a low-bandwidth peripheral bus interface. In some implementations, a channel interface 510 is used to accept transfers from the CPU into the SAU channel registers 512. Typically, the channel interface 510 connects to a high-bandwidth system bus through a bus slave. In various implementations, a master interface 514 is used to perform the access into the peripheral (or other memory) mapped by the SAU. Typically, the master interface 514 connections a high-bandwidth system bus through a bus master. In those implementations, the interface can stall the bus when a read operation is to be performed. Other configurations can accomplish the same tasks.

In general, the SAU control registers that specify mappings (e.g., to associated memory locations) are configurable on a per-channel basis. Those control registers can be protected by an MPU. Alternatively, silicon area can be saved by having a fixed mapping from each channel to its associated memory location. Various implementations can implement a different number of channels, depending on the number and complexity of peripherals on the device, and on the intended application.

In some implementations, a finite state machine (FSM) 516 in the channel section 504 of the SAU accepts requests on interface 510, checks if the requests are valid and to an unlocked channel, and if so, initiates a transfer on master interface 514. The FSM can have states including, for example, waiting, checking a request, initiating a transfer, sending read data, and so on. In some implementations, the FSM 516 is also configured for handling error conditions on the bus and channel lock errors.

Example Control Registers

Figure 5B:
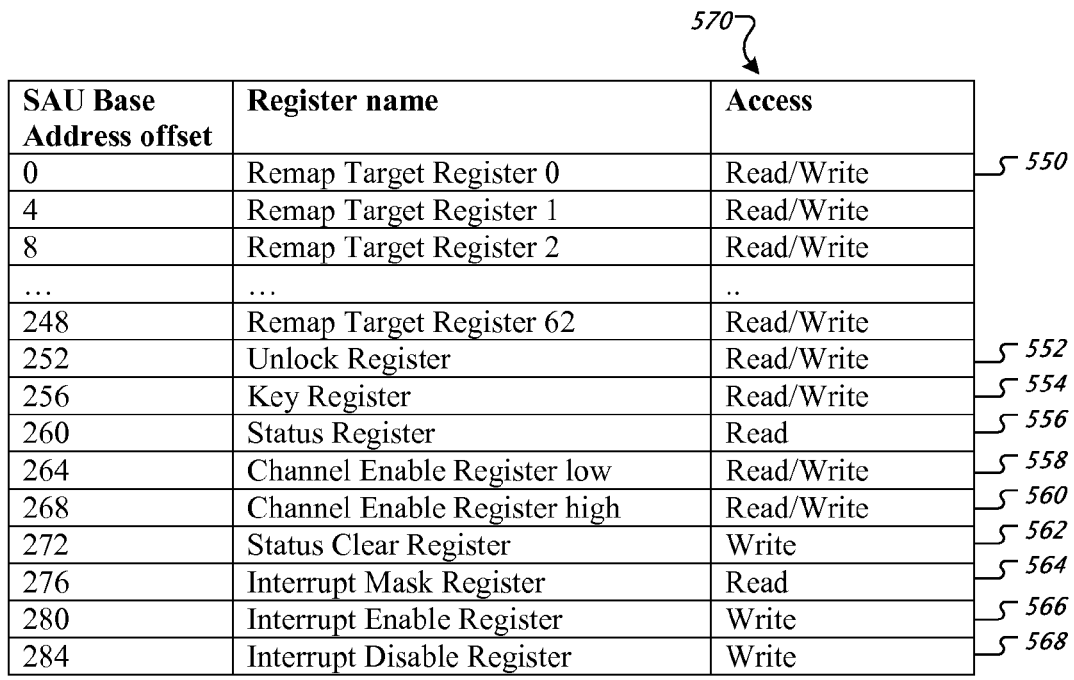
FIG. 5B shows a table of example control registers.

FIG. 5B shows a table of example control registers. In some implementations, the SAU control registers comprise at least the example control registers shown in FIG. 5B. In other implementations, other control registers or other configurations of the example control registers are used.

In some implementations, the SAU control registers include Remap Target Registers (RTR), e.g., 550. Each RTR corresponds to a channel or a channel register. In some implementations, the SAU remaps up to 63 addresses with RTRs. In some implementations, the RTRs fill up 1024 byte-addresses, corresponding to a 1 kB protection region in a memory protection device.

In various implementations, embedded architectures use a 32-bit memory space. Peripherals can be mapped into a small section of this memory space. In some implementations, peripherals are mapped into the address range 0xFFFE0000 to 0xFFFFFFFF. In further implementations, peripheral registers are word-addressable, so bits 1:0 in the address are 0. The RTRs can be physically implemented using 15 flip-flops, expanding to a 32-bit remap address in the following way:

Remap_address [1:0]=0
Remap_address [15:2]=RTR[13:0]
Remap_address [31:16]=(if (RTR[14]==1) 0xffff else 0xfffe)

When writing a 32-bit value to a RTR, the value written can be mapped to the 15 flip-flops in the following way:

RTR[13:0]=write_data[15:2]
RTR[14]=(if (write_data[31:16]==0xffff) 1 else 0)

Thus, in some implementations, the upper 16 bits of an RTR can be compressed to 1 bit, since only 2 different values of these 16 upper bits are used.

In various implementations, the RTRs also function as channel registers. In alternate implementations, the channel registers are separate. For example, the channel registers can be associated with the RTRs.

In some implementations, the SAU control registers include an Unlock Register (UR), e.g., 552. The unlock register must be written with a key and channel to unlock before an access to a channel can be performed. The key is specified in a bitfield in another register, e.g., Key Register 554.

In various implementations, the channel will be unlocked for a number of cycles specified in another bitfield in another control register, e.g., Key Register 554. In some implementations, only one channel can be unlocked at a time. In those implementations, if one channel is currently in an unlocked state, and another channel is unlocked by writing to UR, the first channel can be automatically re-locked. In some implementations, the UR is placed in the same 1 kbyte address range as the RTRs.

In some implementations, the UR has the following bitfields:
UR[7:0]—Unlocking key
UR[5:0]—Channel number to unlock In some implementations, the SAU control registers include a Key Register (KR) 554. The KR can have the following bitfields:
KR[0]—SAU enable
KR[15:8]—Unlocking key. The value specified in this bitfield must be written to UR to unlock a channel.
KR[23:16]—Unlock number of clock cycles. Once a channel has been unlocked, it remains unlocked for this amount of clock cycles or until one access to a channel has been made.

In some implementations, the SAU control registers include a Status register (SR) 556. A processor can read information from the SR to determine the operating state of the SAU. The status register can have the following bitfields:
SR[0]—Unlock expired. An unlock operation was performed, but it timed out before any access was made to a channel.
SR[1]—Channel access successful. The last access to a channel was successful. Can be automatically reset anytime UR is written.
SR[2]—Channel access unsuccessful. An access was attempted to a locked or disabled channel.

In some implementations, the SAU control registers include Channel Enable Registers, e.g., 558 and 560. The Channel Enable Registers can include one bit per channel, where setting the bit enables the corresponding Remap Channel.

In some implementations, the SAU control registers include a Status Clear Register (SCR) 562. Bits in the SCR correspond to bits in the SR 556. Writing a bit in SCR clears the corresponding bit in SR.

In some implementations, the SAU control registers include an Interrupt Mask Register (IMR) 564. Bits in the IMR correspond to bits in the SR 556. If a bit in IMR is set, an interrupt request is generated if the corresponding bit in SR is set. For example, SAU_IRQ (SAU interrupt request)=|(SR & IMR) where | is bitwise-OR and & is bitwise-AND.

In some implementations, the SAU control registers include an Interrupt Enable Register (IER) 566. Bits in the IER correspond to bits in the IMR 564. Writing one to a bit in IER sets the corresponding bit in IMR.

In some implementations, the SAU control registers include a Interrupt Disable Register (IDR) 568. Bits in the IDR correspond to bits in the IMR 564. Writing one to a bit in IER clears the corresponding bit in IMR.

Each of the example control registers can have an access restriction, for example, read only, write only, or read and write. Column 570 shows examples of access restrictions for each of the example control registers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method comprising:
    receiving configuration information including a mapping between a plurality of first memory locations and a plurality of second memory locations, wherein the plurality of second memory locations are protected from direct access by a processor, and wherein the configuration information further includes information associated with valid unlocking keys for accessing the plurality of second memory locations;
    receiving a request from the processor for a memory access at a first memory location included in the plurality of first memory locations, wherein the request is associated with receiving an unlocking key from the processor associated with a memory access exclusively at the first memory location;
    responsive to receiving the unlocking key, determining whether the unlocking key is valid for the requested memory access at the first memory location; and
    responsive to determining that the unlocking key is valid for the requested memory access at the first memory location, identifying a second memory location included in the plurality of second memory locations that is associated with the first memory location based on the mapping included in the configuration information, and performing the memory access at the second memory location based on the request from the processor for the memory access at the first memory location.

2. The method of claim 1, where the requested memory access is performed if the unlocking key is received within a specified range of clock cycles before receiving the request.

3. The method of claim 1, where the second memory location is protected by a memory protection device that prevents the processor from accessing the second memory location, where the prevention is based on an execution state of the processor.

4. The method of claim 3 where the memory protection device protects a memory region that is substantially larger than a region accessed at the second memory location.

5. The method of claim 3 where the prevention is based on the requested memory access.

6. The method of claim 1, where the second memory location is associated with a peripheral device.

7. The method of claim 6, wherein:
    receiving the request from the processor for the memory access at the first memory location includes using a system bus; and
    performing the requested memory access at the second memory location includes using a peripheral bus.

8. The method of claim 1, where performing the requested memory access comprises an action selected from a group including:
    reading a specified amount of data from the second memory location and sending the data to the processor; and
    writing data to the second memory location.

9. The method of claim 1, wherein determining whether the unlocking key is valid comprises:
    comparing the unlocking key received from the processor to information associated with an unlocking key received in the configuration information associated with the first memory location.

10. The method of claim 1, further comprising:
    responsive to determining that the unlocking key is not valid for the requested memory access at the first memory location, ignoring the request from the processor for the memory access at the first memory location.

11. The method of claim 1, wherein the unlocking key is received from the processor at a same time as the request for the memory access, and wherein the unlocking key is valid for the respective request for the memory access.

12. The method of claim 1, wherein a content of memory associated with the first memory location includes information on an address associated with the second memory location.

13. The method of claim 1, wherein performing the memory access at the second memory location based on the request from the processor for the memory access at the first memory location is transparent to the processor.

14. The method of claim 1, wherein the plurality of first memory locations includes channel registers, and wherein the plurality of second memory locations includes control registers.

15. A computer program product, encoded on a non-transitory computer-readable medium, operable to cause data processing apparatus to perform operations comprising:
    receiving configuration information including a mapping between a plurality of first memory locations and a plurality of second memory locations, wherein the plurality of second memory locations are protected from direct access by a processor, and wherein the configuration information further includes information associated with valid unlocking keys for accessing the plurality of second memory locations;
    receiving a request from the processor for a memory access at a first memory location included in the plurality of first memory locations, wherein the request is associated with receiving an unlocking key from the processor associated with a memory access exclusively at the first memory location;
    responsive to receiving the unlocking key, determining whether the unlocking key is valid for the requested memory access at the first memory location; and
    responsive to determining that the unlocking key is valid for the requested memory access at the first memory location, identifying a second memory location included in the plurality of second memory locations that is associated with the first memory location based on the mapping included in the configuration information, and performing the memory access at the second memory location based on the request from the processor for the memory access at the first memory location.

16. The program product of claim 15, where the requested memory access is performed if the unlocking key is received within a specified range of clock cycles before receiving the request.

17. The program product of claim 15, where the second memory location is protected by a memory protection device that prevents the processor from accessing the second memory location, where the prevention is based on an execution state of the processor.

18. The program product of claim 17 where the memory protection device protects a memory region that is substantially larger than a region accessed at the second memory location.

19. The program product of claim 17 where the prevention is based on the requested memory access.

20. The program product of claim 15, where the second memory location is associated with a peripheral device.

21. The computer program product of claim 15, wherein performing the memory access at the second memory location based on the request from the processor for the memory access at the first memory location is transparent to the processor.

22. The computer program product of claim 15, wherein the plurality of first memory locations includes channel registers, and wherein the plurality of second memory locations includes control registers.

23. A system comprising:
   a processor;
   a memory protection device; and
   a secure access unit, where the secure access unit is operable to perform operations comprising:
      receiving configuration information including a mapping between a plurality of first memory locations and a plurality of second memory locations, wherein the plurality of second memory locations are protected from direct access by a processor, and wherein the configuration information further includes information associated with valid unlocking keys for accessing the plurality of second memory locations;
      receiving a request from the processor for a memory access at a first memory location included in the plurality of first memory locations, wherein the request is associated with receiving an unlocking key from the processor associated with a memory access exclusively at the first memory location;
      responsive to receiving the unlocking key, determining whether the unlocking key is valid for the requested memory access at the first memory location; and
      responsive to determining that the unlocking key is valid for the requested memory access at the first memory location, identifying a second memory location included in the plurality of second memory locations that is associated with the first memory location based on the mapping included in the configuration information, and performing the memory access at the second memory location based on the request from the processor for the memory access at the first memory location.

24. The system of claim 23, where the secure access unit performs the requested memory access if the secure access unit receives the unlocking key within a specified range of clock cycles before receiving the request.

25. The system of claim 23, where the memory protection device prevents the processor from accessing the second memory location based on an execution state of the processor and the requested memory access.

26. The system of claim 23, where the memory protection device protects a memory region that is substantially larger than a region accessed at the second memory location.

27. The system of claim 23, further comprising a system bus and a peripheral bus, wherein:
   receiving the request from the processor for the memory access at the first memory location comprises using the system bus;
   the second memory location is associated with a peripheral device; and
   performing the requested memory access further comprises using the peripheral bus.

28. The system of claim 23, wherein performing the memory access at the second memory location based on the request from the processor for the memory access at the first memory location is transparent to the processor.

29. The system of claim 23, wherein the plurality of first memory locations includes channel registers, and wherein the plurality of second memory locations includes control registers.

* * * * *

UNITED STATES PATENT AND TRADEMARK OFFICE
CERTIFICATE OF CORRECTION

| | | |
|---|---|---|
| PATENT NO. | : 8,209,509 B2 | Page 1 of 1 |
| APPLICATION NO. | : 12/120165 | |
| DATED | : June 26, 2012 | |
| INVENTOR(S) | : Erik Knutsen Renno | |

It is certified that error appears in the above-identified patent and that said Letters Patent is hereby corrected as shown below:

On the title pages, column 2, (Other Publications), line 6, please delete "Aparatus" and insert therefor --Apparatus--.

Signed and Sealed this
Fourteenth Day of August, 2012

David J. Kappos
*Director of the United States Patent and Trademark Office*